US012525178B2

(12) United States Patent
Sun et al.

(10) Patent No.: US 12,525,178 B2
(45) Date of Patent: Jan. 13, 2026

(54) DISPLAY PANELS AND DISPLAY DEVICES

(71) Applicant: WUHAN CHINA STAR OPTOELECTRONICS SEMICONDUCTOR DISPLAY TECHNOLOGY CO., LTD., Hubei (CN)

(72) Inventors: Feixiang Sun, Hubei (CN); Hongyan Liu, Hubei (CN); Yi Liu, Hubei (CN)

(73) Assignee: WUHAN CHINA STAR OPTOELECTRONICS SEMICONDUCTOR DISPLAY TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 18/912,268

(22) Filed: Oct. 10, 2024

(65) Prior Publication Data

US 2025/0037649 A1 Jan. 30, 2025

Related U.S. Application Data

(63) Continuation of application No. 18/523,441, filed on Nov. 29, 2023, now Pat. No. 12,142,201.

(30) Foreign Application Priority Data

Jun. 6, 2023 (CN) ......................... 202310671305.4

(51) Int. Cl.
*G09G 3/32* (2016.01)

(52) U.S. Cl.
CPC ....... *G09G 3/32* (2013.01); *G09G 2300/0819* (2013.01); *G09G 2300/0852* (2013.01); *G09G 2310/08* (2013.01); *G09G 2320/0247* (2013.01); *G09G 2320/045* (2013.01); *G09G 2330/021* (2013.01)

(58) Field of Classification Search
CPC ............. G09G 3/32; G09G 2300/0819; G09G 2300/0852; G09G 2310/08; G09G 2320/0247; G09G 2320/045; G09G 2330/021
See application file for complete search history.

(56) References Cited

U.S. PATENT DOCUMENTS 12,148,372 B2 * 11/2024 Zhang .................. G09G 3/3233
2017/0110055 A1 * 4/2017 Li ........................ H10K 59/131
(Continued)

*Primary Examiner* — Sejoon Ahn
(74) *Attorney, Agent, or Firm* — HSML P.C.

(57) ABSTRACT

A display including a pixel circuit is provided. The pixel circuit includes a driving transistor, a writing transistor connected in series between a data line and the second node or the third node, an initialization module, and a compensation transistor connected in series between the first node and the second node or the third node. In the driving transistor, a gate is connected to the first node, a first electrode is connected to the second node, and a second electrode is connected to the third node. A gate of the writing transistor is connected to a scanning signal. The initialization module is connected to the first, second, and/or third nodes to perform resetting. The compensation transistor remains a turned-on state in only one continuous time period in each frame, and the initialization module and the writing transistor turn on in a time-sharing manner in the continuous time period.

19 Claims, 9 Drawing Sheets

(56) References Cited

U.S. PATENT DOCUMENTS

| | | | | |
|---|---|---|---|---|
| 2019/0189047 | A1 | 6/2019 | Kim | |
| 2019/0189065 | A1 | 6/2019 | Wu et al. | |
| 2019/0189067 | A1 | 6/2019 | Li | |
| 2019/0189681 | A1 | 6/2019 | Chae et al. | |
| 2019/0189708 | A1 | 6/2019 | Lee et al. | |
| 2020/0273410 | A1* | 8/2020 | Yu | G09G 3/3233 |
| 2025/0078747 | A1* | 3/2025 | Yuan | G09G 3/32 |
| 2025/0232717 | A1* | 7/2025 | Gai | G09G 3/3233 |
| 2025/0235283 | A1* | 7/2025 | Mac Carthy | A61B 42/40 |

* cited by examiner

DISPLAY PANELS AND DISPLAY DEVICES

CROSS-REFERENCE TO RELATED APPLICATION

This application is a continuation of U.S. patent application Ser. No. 18/523,441, filed on Nov. 29, 2023, which claims priority to Chinese Patent Application No. 202310671305.4, filed on Jun. 6, 2023, the disclosure of which is incorporated herein by reference in its entirety.

TECHNICAL FIELD

The present disclosure relates to display technologies, and in particular, to display panels and display devices.

BACKGROUND

In a display device, a gate driving circuit and a pixel circuit usually need to cooperate with each other to realize display with different refresh frequencies.

However, to realize different refresh frequencies in different areas, the gate driving circuit cannot satisfy outputting a drive requirement of two pulses. As a result, a gate driving signal required by a corresponding transistor in a pixel circuit cannot match an output signal of the gate driving circuit, a reset function of the pixel circuit cannot be completely performed, and afterimages and flickers are prone to occur.

SUMMARY

According to a first aspect, the present disclosure provides a display panel. The display panel includes a first gate driving circuit providing a first gate driving signal, a second gate driving circuit providing a second gate driving signal, a third gate driving circuit providing a third gate driving signal, a fourth gate driving circuit providing a scanning signal, and a pixel circuit. The pixel circuit includes a driving transistor, a writing transistor, an initialization module, and a compensation transistor. A gate of the driving transistor is connected to a first node, a first electrode of the driving transistor is connected to a second node, and a second electrode of the driving transistor is connected to a third node. The writing transistor is connected in series between a data line and the second node or the third node, and a gate of the writing transistor is connected to the scanning signal. The initialization module is connected to at least one of the first node, the second node, and the third node, to perform resetting according to at least one of the first gate driving signal and the second gate driving signal. The compensation transistor is connected in series between the first node and the second node or the third node, and a gate of the compensation transistor is connected to the third gate driving signal. The compensation transistor remains a turned-on state in only one continuous time period in each frame, and the initialization module and the writing transistor are turned on in a time-sharing manner in the continuous time period.

According to a second aspect, the present disclosure provides a display device. The display device includes the above display panel. The display device further includes a light-emitting device, a storage capacitor, a boost capacitor, and a third initialization transistor, the storage capacitor is connected in series between the first node and the first power cable, the boost capacitor is connected in series between the first node and a scanning line, the light-emitting device is connected in series between the second light-emitting control transistor and the second power cable, the third initialization transistor is connected in series between a third initialization line and an anode of the light-emitting device, and a gate of the third initialization transistor is connected to the gate of the second initialization transistor.

BRIEF DESCRIPTION OF THE DRAWINGS

The following describes specific implementations of the present disclosure in detail with reference to the accompanying drawings, to make the technical solutions and other beneficial effects of the present disclosure obvious.

DETAILED DESCRIPTION

The following clearly and completely describes technical solutions in the embodiments of the present disclosure with reference to the accompanying drawings in the embodiments of the present disclosure. Apparently, the described embodiments are only some embodiments rather than all embodiments of the present disclosure. All other embodiments obtained by a person skilled in the art based on the embodiments of the present disclosure without creative efforts shall fall within the protection scope of the present disclosure.

In addition, terms "first" and "second" are used merely for the purpose of description, and shall not be construed as indicating or implying relative importance or implying a quantity of indicated technical features. Therefore, a feature restricted by "first" or "second" may explicitly indicate or implicitly include one or more such features. In description of the present disclosure, "a plurality of" means at least two, such as two and more than two unless it is specifically defined otherwise.

Figure 1:
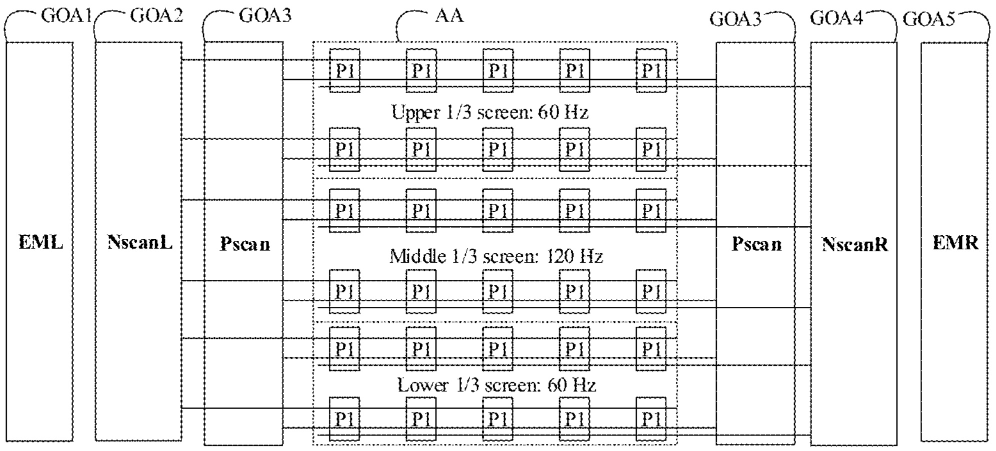
FIG. 1 is a schematic diagram of a structure of a display panel according to some embodiments of the present disclosure.

Refer to FIGS. 1 to 7. FIG. 1 is a schematic diagram of a structure of a display panel according to some embodiments of the present disclosure. The display panel includes a plurality of pixel circuits P1 distributed in an array in a display area AA and a plurality of gate driving circuits located on both sides of the display area AA.

The plurality of gate driving circuits may include, for example, a first gate driving circuit GOA2 located on a left side of the display area AA. The first gate driving circuit GOA2 may provide a first gate driving signal NscanL for a gate of a first initialization transistor M4 in a pixel circuit P1 shown in FIG. 4.

The display panel further includes a second gate driving circuit GOA5. The second gate driving circuit GOA5 provides a second gate driving signal EMR for a gate of a second initialization transistor M8 and a gate of a third initialization transistor M7 that are in the pixel circuit P1 shown in FIG. 4.

The display panel further includes a third gate driving circuit GOA4 located on a right side of the display area AA. The third gate driving circuit GOA4 may provide a third gate driving signal NscanR for a gate of a compensation transistor M3 in the pixel circuit P1 shown in FIG. 4.

The display area AA may be divided into a plurality of display partitions along a scanning direction, to implement display with different refresh frequencies in different display partitions or different split screens. The plurality of display partitions may be, for example, at least two of an upper ⅓ screen, a middle ⅓ screen, and a lower ⅓ screen, or may be more display partitions.

Figure 2A:
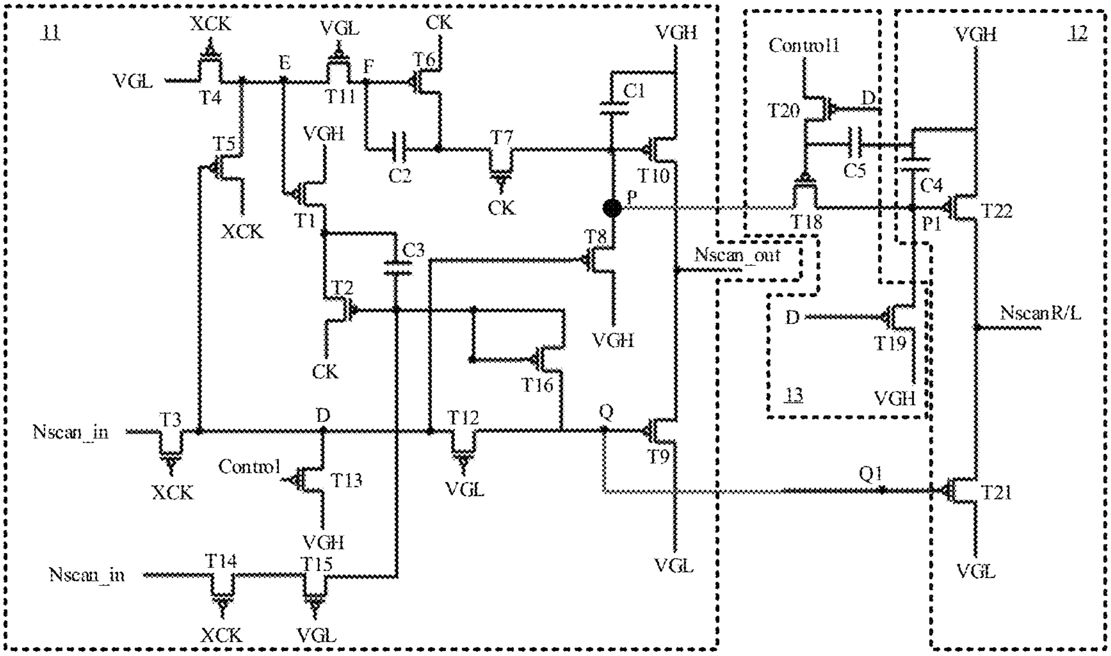
FIG. 2A is a schematic diagram of a structure of a gate driving circuit according to some embodiments of the present disclosure.
Figure 2B:
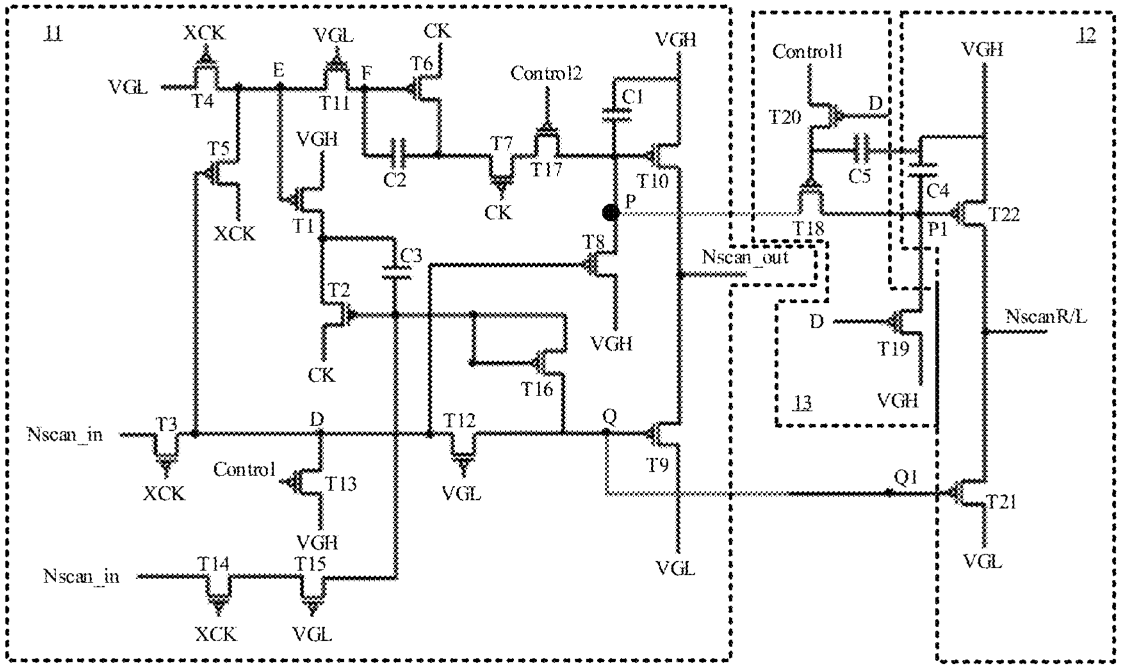
FIG. 2B is a schematic diagram of another structure of a gate driving circuit according to some embodiments of the present disclosure.

Both of the first gate driving circuit GOA2 and the third gate driving circuit GOA4 may use a gate driving circuit shown in FIG. 2A or 2B, and use single-side drive to reduce space occupied by frames. For example, each shift register in the first gate driving circuit GOA2 provides the first gate driving signal NscanL for a plurality of pixel circuits P1 of one row through a gate driving line. Each shift register in the third gate driving circuit GOA4 provides the third gate driving signal NscanR for a plurality of pixel circuits P1 of one row through a gate driving line.

Figure 4:
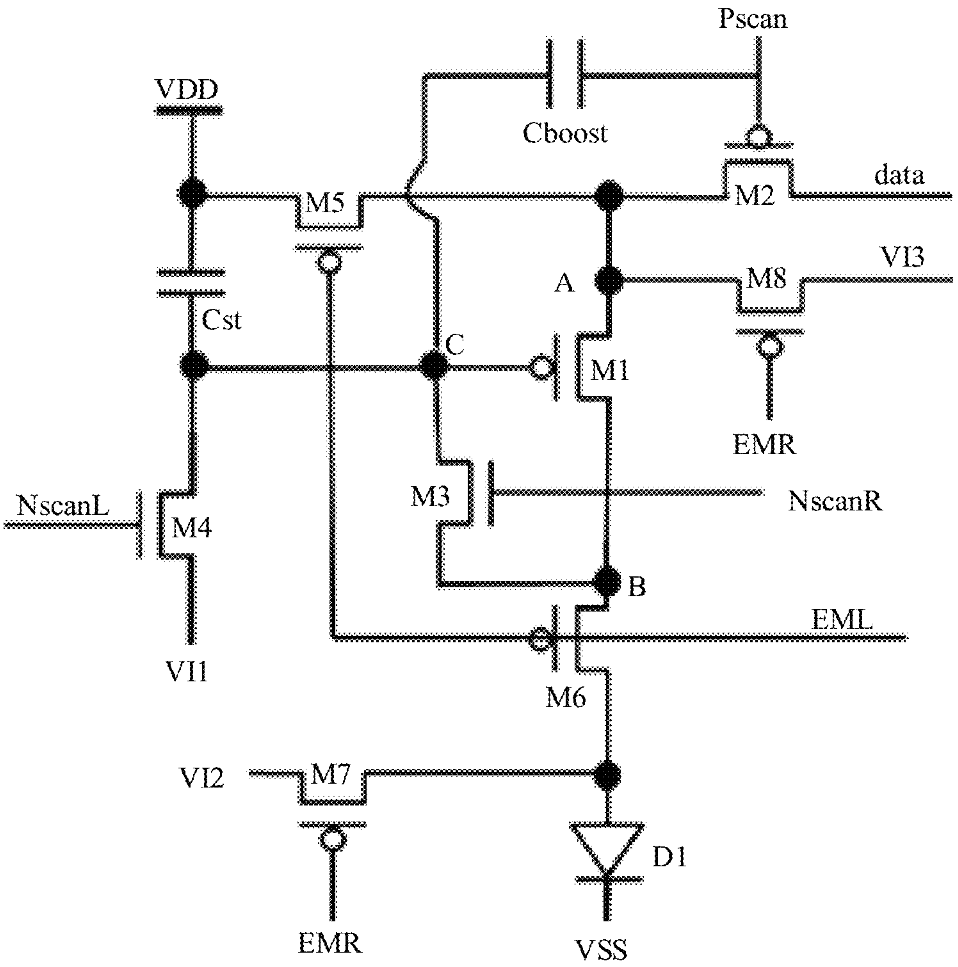
FIG. 4 is a schematic diagram of a structure of a pixel circuit according to some embodiments of the present disclosure.

The display panel further includes two same fourth gate driving circuits GOA3, both of which use two-side drive to improve a drive capability. That is, a plurality of pixel circuits P1 in every two rows are connected to an output end of a shift register in each of two fourth gate driving circuits GOA3 through corresponding gate driving lines, so that a gate of a writing transistor M2 in the pixel circuit P1 shown in FIG. 4 is connected to a scanning signal Pscan.

The display panel further includes a fifth gate driving circuit GOA1. The fifth gate driving circuit GOA1 provides a light-emitting control signal EML for a gate of a first light-emitting control transistor M5 and a gate of a second light-emitting control transistor M6 that are in the pixel circuit P1 shown in FIG. 4.

FIG. 2A is a schematic diagram of a structure of a gate driving circuit according to some embodiments of the present disclosure. FIG. 2B is a schematic diagram of another structure of a gate driving circuit according to some embodiments of the present disclosure. Refer to FIGS. 2A and 2B. The gate driving circuit includes a plurality of cascaded shift registers, and each shift register includes a cascade transmission module 11, a frequency division control module 13, and an output module 12.

The cascade transmission module 11 includes a first pull-up node P, a first pull-down node Q, and a node D. The cascade transmission module 11 is configured to output a corresponding cascade signal Nscan_out according to a potential of the first pull-up node P and a potential of the first pull-down node Q. A cascade signal Nscan_out output by a shift register at a certain stage is used as a cascade signal Nscan_in of a shift register at a stage immediately subsequent to the certain stage.

The output module 12 includes a second pull-up node P1 and a second pull-down node Q1. The output module 12 is configured to output a corresponding gate driving signal NscanR/L according to a potential of the second pull-up node P1 and a potential of the second pull-down node Q1.

The first pull-down node Q and the second pull-down node Q1 are directly connected, or the first pull-down node Q and the second pull-down node Q1 may be a same node.

The frequency division control module 13 is connected between the first pull-up node P, the second pull-up node P1, and the node D. The frequency division control module 13 is configured to control the potential of the second pull-up node P1 according to a first frequency division control signal Control1, to control the output module 12 to output a gate driving signal NscanR/L with a positive pulse from a writing frame, and output a gate driving signal NscanR/L without a positive pulse from a maintaining frame in each frame, to drive a corresponding pixel circuit P1 to perform display with different refresh frequencies.

It should be noted that, by controlling switching of a transistor T20 using the node D, the potential of the second pull-up node P1 may be stabilized, so that a high potential (that is, a pulse amplitude) of the gate driving signal NscanR/L can be stabilized. A capacitor C5 may stabilize a potential of a control terminal of a transistor T18, so that the potential of the second pull-up node P1 can be further stabilized.

Compared to the gate driving circuit shown in FIG. 2A, the gate driving circuit shown in FIG. 2B further includes a transistor T17 connected in series between a transistor T7 and the first pull-up node P. By controlling switching of the transistor T17 using a second frequency division control signal Control2, a corresponding pixel circuit P1 can be driven to perform display with different refresh frequencies, and whether the cascade signal Nscan_out is outputted can further be controlled, to control a working state of the shift register at the stage immediately subsequent to the certain stage, thereby helping to saving power consumption.

In other words, through control of the first frequency division control signal Control1 and/or the second frequency division control signal Control2, the gate driving circuit can drive the corresponding pixel circuit P1 to display with different refresh frequencies.

It should be noted that, VGH at a high-potential signal can control an N-channel transistor to be switched on or a P-channel transistor to be switched off; and VGL at a low-potential signal may control the N-channel transistor to be switched off or the P-channel transistor to be switched on. A frequency of a clock signal CK is the same as a frequency of a clock signal XCK, but a phase difference between the clock signal CK and the clock signal XCK is 180°.

Optionally, to simplify a preparation process and improve dynamic performance, each transistor in the above shift register is a thin film transistor of the same type. For example, the transistor may be a P-channel thin film transistor (e.g., a P-channel low temperature polysilicon thin film transistor). As another example, the transistor may be an N-channel thin film transistor as required.

Figure 3A:
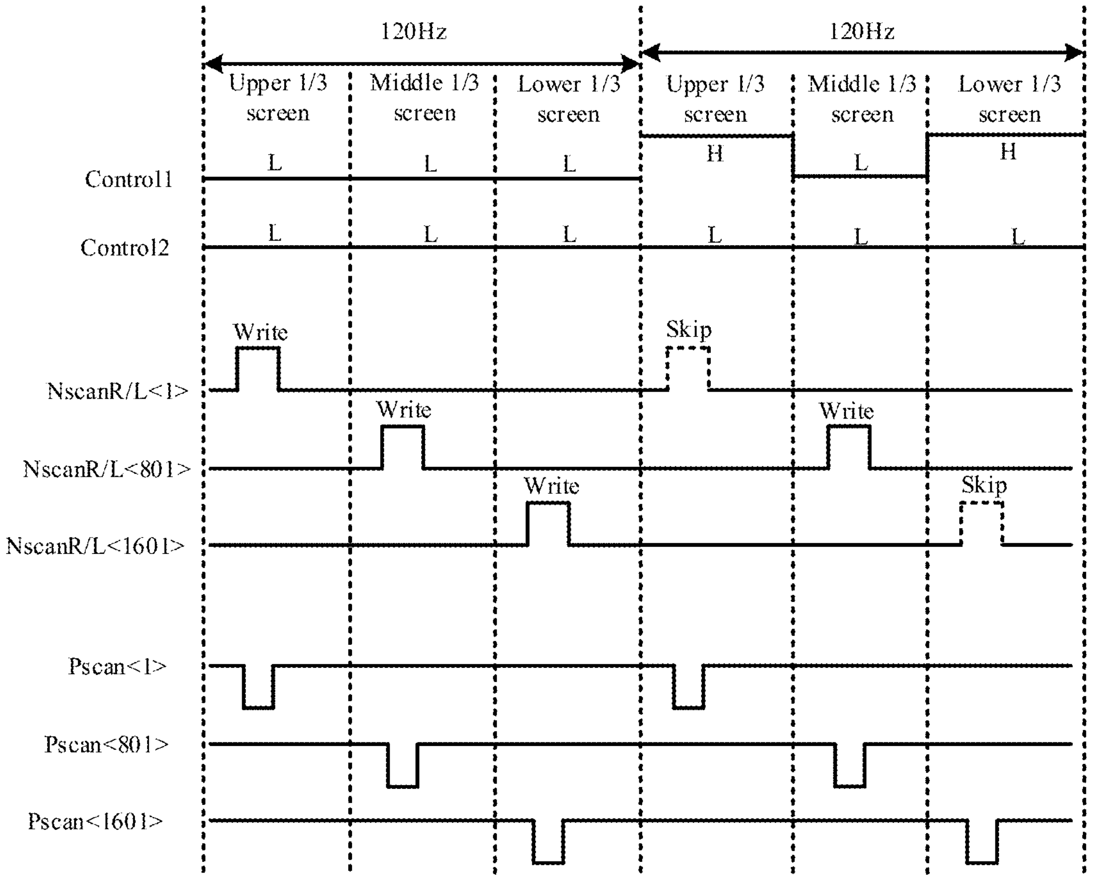
FIG. 3A is a schematic diagram of a time sequence of the gate driving circuits shown in FIGS. 2A and 2B implementing corresponding refresh frequencies.

FIG. 3A is a schematic diagram of a time sequence of the gate driving circuits shown in FIGS. 2A and 2B implementing corresponding refresh frequencies. When not including the second frequency division control signal Control2, FIG. 3A may be applicable to the gate driving circuit shown in FIG. 2A. When including the second frequency division control signal Control2, FIG. 3A may be applicable to the gate driving circuit shown in FIG. 2B. In FIG. 3A, a potential of the second frequency division control signal Control2 remains a low potential (L), and the transistor T17 is in a turned-on state. Taking a condition, in which a maximum refresh frequency is 120 Hz, and an upper ⅓ screen, a middle ⅓ screen, and a lower ⅓ screen distributed along a scanning direction respectively implement refresh frequencies of 60 Hz, 120 Hz and 60 Hz, an example, the explanation is as follows.

To enable the upper ⅓ screen to display with the 60 Hz refresh frequency, a first frame is displayed with the 120 Hz refresh frequency, and the first frequency division control signal Control1 at a low potential is connected to the upper ⅓ screen to turn on the transistor T18 through the transistor T20. Under the control of the second pull-up node P1, a transistor T22 is turned on, and a gate driving signal NscanR/L<1> in the upper ⅓ screen outputs a corresponding positive pulse. In a second frame of the 120 Hz refresh frequency, the first frequency division control signal Control1 at a high potential (H) is connected to the upper ⅓ screen to turn off the transistor T18. Under the control of the second pull-up node P1, the transistor T22 is turned off, and the gate driving signal NscanR/L<1> in the upper ⅓ screen outputs a corresponding low potential. A combination of the first frame and the second frame is displayed with the 60 Hz refresh frequency. A scanning signal Pscan<1> in the upper ⅓ screen has a negative pulse synchronously and a data signal may be written into a gate of a driving transistor M1, the first frame may be referred to as a writing frame, and the second frame may be referred to as a maintaining frame.

To enable the middle ⅓ screen to display with the 120 Hz refresh frequency, the first frame is displayed with the 120 Hz refresh frequency, and the first frequency division control signal Control1 at the low potential is connected to the middle ⅓ screen to switch on the transistor T18 through the transistor T20. Under the control of the second pull-up node P1, the transistor T22 is turned on, and a gate driving signal NscanR/L<801> in the middle ⅓ screen outputs a corresponding positive pulse. The second frame is displayed with the 120 Hz refresh frequency, and the first frequency division control signal Control1 at the low potential is connected to the middle ⅓ screen to turn on the transistor T18 through the transistor T20. Under the control of the second pull-up node P1, the transistor T22 is turned on, and the gate driving signal NscanR/L<801> in the middle ⅓ screen outputs a corresponding positive pulse. When the maximum refresh frequency is used for display, since a plurality of scanning signals Pscan<801> in the middle ⅓ screen each have a negative pulse synchronously and the data signal may be written into the gate of the driving transistor M1, each frame may be a writing frame.

A time sequence of the lower ⅓ screen and a time sequence of the upper ⅓ screen are the same, so that the lower ⅓ screen can be displayed with the 60 Hz refresh frequency. NscanR/L<1601> is a gate driving signal output from the lower ⅓ screen. Pscan<1601> is a scanning signal connected in the lower ⅓ screen.

Figure 3B:
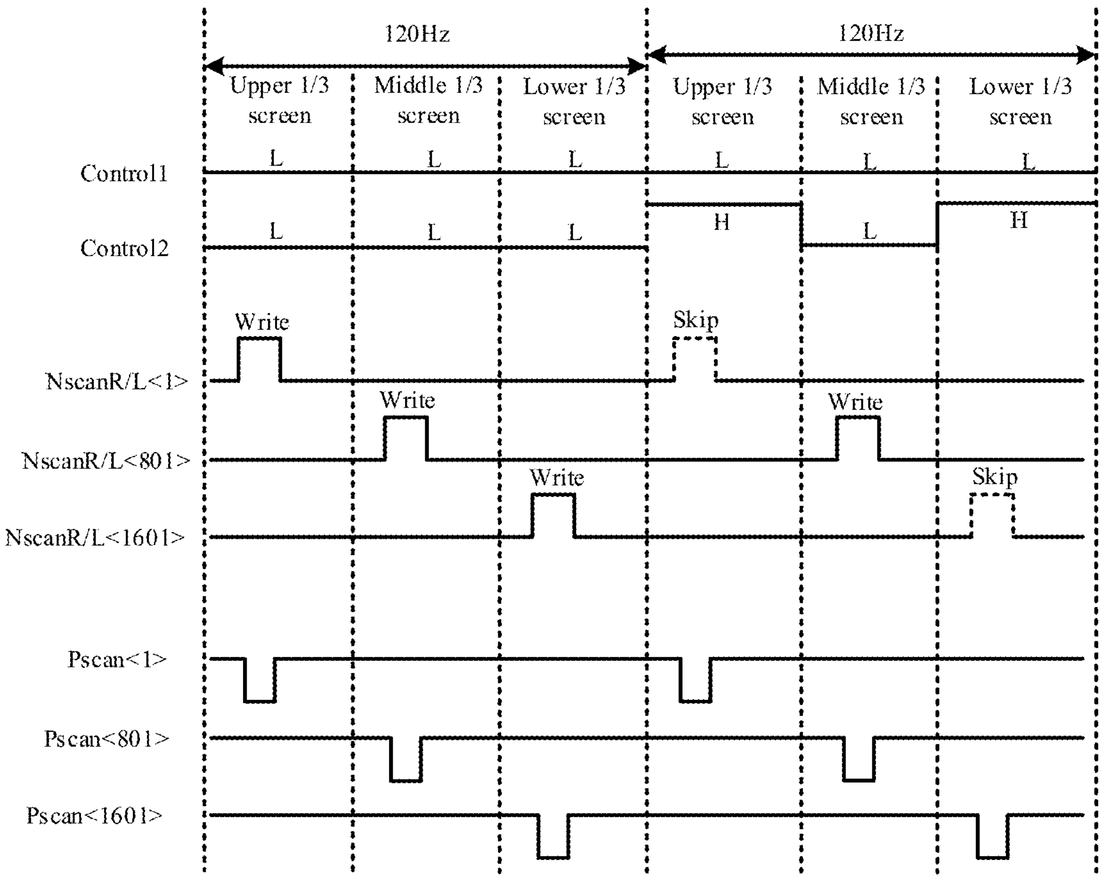
FIG. 3B is a schematic diagram of a time sequence of the gate driving circuit shown in FIG. 2B implementing a corresponding refresh frequency.

FIG. 3B is a schematic diagram of time sequence of the gate driving circuit shown in FIG. 2B implementing a corresponding refresh frequency. Compared with FIG. 3A, in FIG. 3B, the first frequency division control signal Control1 remains a low potential, and only the second frequency division control signal Control2 is used to implement display with a corresponding refresh frequency and control whether the cascade signal Nscan_out is outputted.

To enable display of the upper ⅓ screen to display with the 60 Hz refresh frequency, the first frame is displayed with the 120 Hz refresh frequency, and the second frequency division control signal Control2 at a low potential is connected to the upper ⅓ screen to turn on the transistor T17. Under the control of the second pull-up node P1, the transistor T22 is turned on, and a gate driving signal NscanR/L<1> in the upper ⅓ screen outputs a corresponding positive pulse. A second frame is displayed with the 120 Hz refresh frequency, the second frequency division control signal Control2 at a high potential (H) is connected to the upper ⅓ screen to turn off the transistor T17. Under the control of the second pull-up node P1, the transistor T22 is turned off, and the gate driving signal NscanR/L<1> in the upper ⅓ screen outputs a corresponding low potential. A combination of the first frame and the second frame is displayed with the 60 Hz refresh frequency. The first frame may be referred to as a writing frame, and the second frame may be referred to as a maintaining frame.

To enable the middle ⅓ screen to display with the 120 Hz refresh frequency, the first frame is displayed with the 120 Hz refresh frequency, and the second frequency division control signal Control2 at a low potential is connected to the middle ⅓ screen to switch on the transistor T17. Under the control of the second pull-up node P1, the transistor T22 is turned on, and a gate driving signal NscanR/L<801> in the middle ⅓ screen outputs a corresponding positive pulse. The second frame is displayed with the 120 Hz refresh frequency, and the second frequency division control signal Control2 at the low potential is connected to the middle ⅓ screen to switch on the transistor T17. Under the control of the second pull-up node P1, the transistor T22 is turned on, and the gate driving signal NscanR/L<801> in the middle ⅓ screen outputs a corresponding positive pulse.

The time sequence of the lower ⅓ screen and the time sequence of the upper ⅓ screen are the same, so that the lower ⅓ screen can be displayed with the 60 Hz refresh frequency.

Figure 3C:
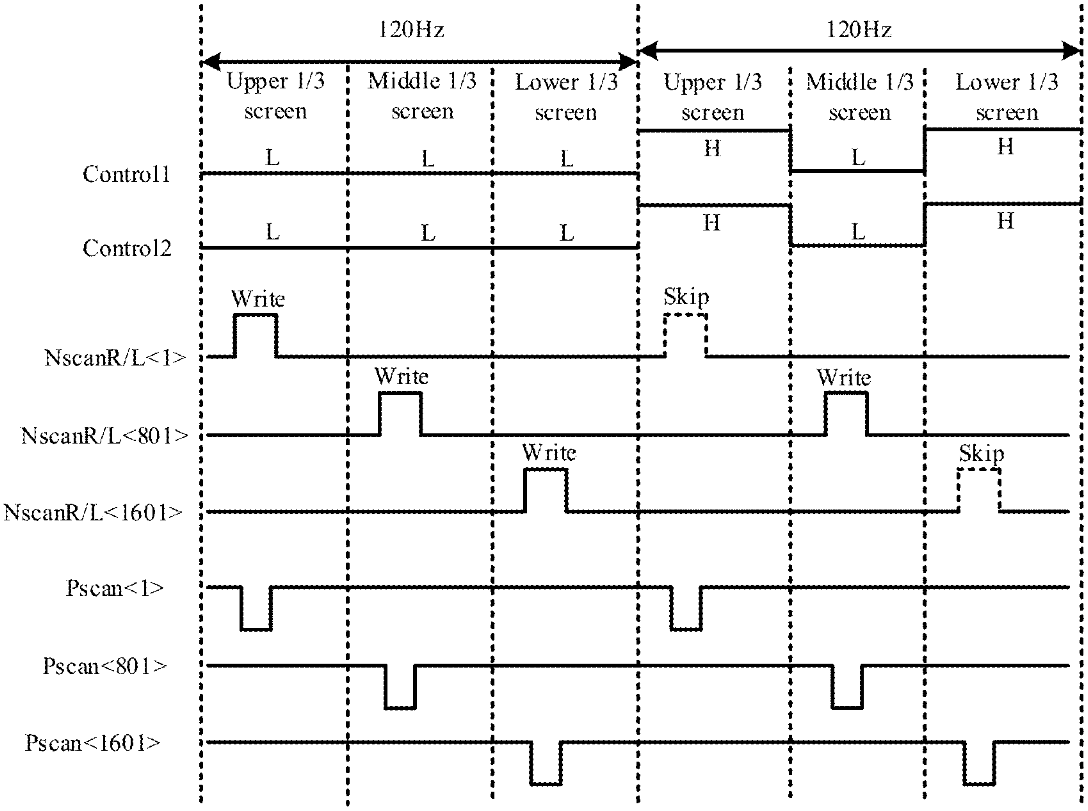
FIG. 3C is a schematic diagram of another time sequence of the gate driving circuit shown in FIG. 2B implementing a corresponding refresh frequency.

FIG. 3C is another schematic diagram of time sequence of the gate driving circuit shown in FIG. 2B implementing a corresponding refresh frequency. Compared to FIGS. 3A and 3B, in FIG. 3C, the first frequency division control signal Control1 and the second frequency division control signal Control2 remain synchronous, which can also implement display with a corresponding refresh frequency, and control whether the cascade signal Nscan_out is outputted.

To enable the upper ⅓ screen to display with the 60 Hz refresh frequency, the first frame is displayed with the 120 Hz refresh frequency, the first frequency division control signal Control1 at a low potential is connected to the upper ⅓ screen to turn on the transistor T18 through the transistor T20, and the second frequency division control signal Control2 at a low potential is connected to the upper ⅓ screen to turn on the transistor T17. Under the control of the second pull-up node P1, the transistor T22 is turned on, and a gate driving signal NscanR/L<1> in the upper ⅓ screen outputs a corresponding positive pulse. The second frame is displayed with the 120 Hz refresh frequency, the first frequency division control signal Control1 and the second frequency division control signal Control2 that are at a high potential (H) are connected to the upper ⅓ screen to turn off the transistor T17 and the transistor T18. Under the control of the second pull-up node P1, the transistor T22 is switched off, and the gate driving signal NscanR/L<1> in the upper ⅓ screen outputs a corresponding low potential.

To enable the middle ⅓ screen to display with the 120 Hz refresh frequency, the first frame is displayed with the 120

Hz refresh frequency, and the first frequency division control signal Control1 of the low potential is connected to the middle ⅓ screen to turn on the transistor T18 through the transistor T20, and the second frequency division control signal Control2 at the low potential is connected to the middle ⅓ screen to turn on the transistor T17. Under the control of the second pull-up node P1, the transistor T22 is turned on, and a gate driving signal NscanR/L<801> in the middle ⅓ screen outputs a corresponding positive pulse. The second frame is displayed with the 120 Hz refresh frequency, and the first frequency division control signal Control1 at the low potential is connected to the middle ⅓ screen to turn on the transistor T18 through the transistor T20, and the second frequency division control signal Control2 at the low potential is connected to the middle ⅓ screen to turn on the transistor T17. Under the control of the second pull-up node P1, the transistor T22 is turned on, and the gate driving signal NscanR/L<801> in the middle ⅓ screen outputs a corresponding positive pulse.

The time sequence of the lower ⅓ screen and the time sequence of the upper ⅓ screen are the same, so that the lower ⅓ screen can be displayed with the 60 Hz refresh frequency.

Based on the above analysis, it can be seen that the gate driving circuits shown in FIGS. 2A and 2B output one pulse only in a writing frame to drive a corresponding transistor in the pixel circuit P1 to turn on, to implement display with a corresponding refresh frequency.

However, in the pixel circuit P1 shown in FIG. 4, the gate of the compensation transistor M3 needs to be connected to a gate driving signal NscanR/L output by the gate driving circuit shown in FIG. 2A or 2B, and the gate of the first initialization transistor M4 needs to be connected to a gate driving signal NscanR/L output by the gate driving circuit shown in FIG. 2A or 2B, and the gate of the compensation transistor M3 and the gate of the first initialization transistor M4 are respectively connected to gate driving signals NscanR/L output by different gate driving circuits.

Figure 5:
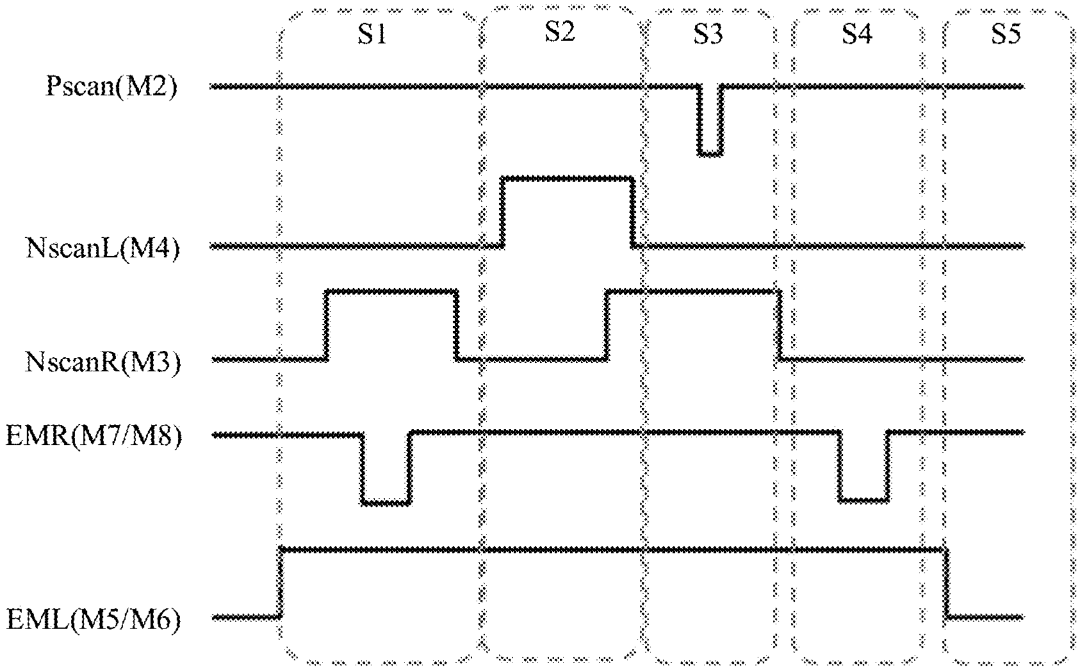
FIG. 5 is a schematic diagram of a time sequence of the pixel circuit shown in FIG. 4 in the related art.

When the pixel circuit P1 shown in FIG. 4 works in a time sequence shown in FIG. 5, the gate of the compensation transistor M3 needs to be connected to the third gate driving signal NscanR with two pulses in the writing frame, but the gate driving circuit shown in FIG. 2A or 2B outputs one pulse only in the writing frame. As a result, the gate driving circuit cannot match the pixel circuit P1.

Figure 6:
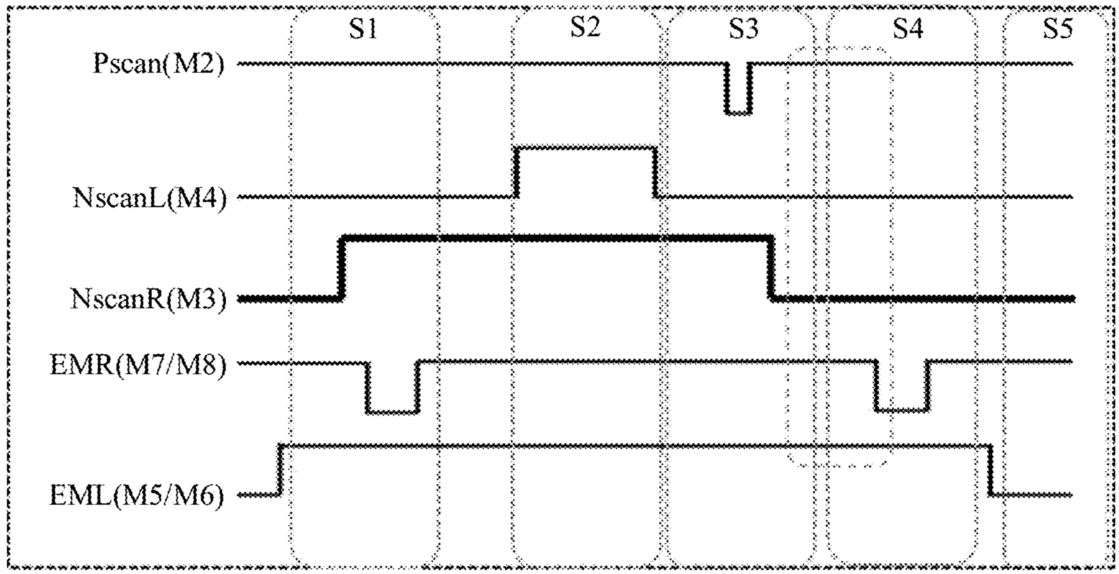
FIG. 6 is a schematic diagram of a time sequence of the pixel circuit shown in FIG. 4.

In summary, for a technical problem mentioned above that a reset function of the pixel circuit P1 cannot be completely performed under different refresh frequencies, the present disclosure provides a pixel circuit P1. Refer to FIGS. 4 to 7. As shown in FIGS. 4 and 6, the pixel circuit P1 includes at least one of a driving transistor M1, a writing transistor M2, a first light-emitting control transistor M5, a second light-emitting control transistor M6, an initialization module, and a compensation transistor M3.

A gate of the driving transistor M1 is connected to a first node C, a first electrode of the driving transistor M1 is connected to a second node A, and a second electrode of the driving transistor M1 is connected to a third node B.

The writing transistor M2 is connected in series between a data line and the second node A or the third node B, and a gate of the writing transistor M2 is connected to a scanning line.

The initialization module is connected to at least one of the first node C, the second node A, or the third node B, to perform resetting according to at least one of a first gate driving signal NscanL or a second gate driving signal EMR.

The first light-emitting control transistor M5 is connected in series between the second node A and a first power cable, and a gate of the first light-emitting control transistor M5 is connected to a light-emitting control line.

The second light-emitting control transistor M6 is connected in series between the third node B and a second power cable, and a gate of the second light-emitting control transistor M6 is connected to the light-emitting control line.

The compensation transistor M3 is connected in series between the first node C and the second node A or the third node B, and a gate of the compensation transistor M3 is connected to a third gate driving line.

The compensation transistor M3 remains a turned-on state in only one continuous time period in each frame, and the initialization module and the writing transistor M2 are turned on in a time-sharing manner in the continuous time period.

It may be understood that, in the pixel circuit P1 herein, through only one pulse of a gate driving signal, the compensation transistor M3 remains the turned-on state in only one continuous time period in each frame. Compared to a plurality of pulses of a gate driving signal, more driving methods for the pixel circuit P1 are obtained, and a quantity of high and low potential switching times of the gate driving signal and a quantity of switching times of the compensation transistor M3 are reduced, thereby reducing power consumption of the pixel circuit P1 and prolonging a service life of the compensation transistor M3.

In addition, the compensation transistor M3 remains the turned-on state in only one continuous time period in each frame, and the initialization module and the writing transistor M2 are turned on in the time-sharing manner in the continuous time period. In this way, the compensation transistor M3 and the initialization module can be controlled to be synchronously turned on in the continuous time period to reset the first node, the second node, and the third node once, and the compensation transistor M3 and the writing transistor M2 can also be controlled to be synchronously turned on in the continuous time period to write the data signal into the gate of the driving transistor M1, so that a threshold voltage drift of the driving transistor M1 can be reduced or prevented, and light-emitting luminance of the pixel circuit P1 can be stabilized, thereby reducing a risk of flickers.

It should be noted that, the scanning line is configured to transmit a scanning signal Pscan. The data line is configured to transmit a data signal data.

It should be noted that, the first power cable is configured to transmit a positive power signal VDD, the second power cable is configured to transmit a negative power signal VSS, and a potential of the positive power signal VDD is higher than a potential of the negative power signal VSS.

The light-emitting control line is configured to transmit a light-emitting control signal EML. The gate of the first light-emitting control transistor M5 and the gate of the second light-emitting control transistor M6 share one light-emitting control line, which saves a quantity of light-emitting control lines required by the pixel circuit P1, thereby reducing an area occupied by a display area and improving an aperture ratio and pixel density.

In some embodiments, the initialization module includes a first initialization transistor M4, the first initialization transistor M4 is connected in series between the first node C and a first initialization line, and a gate of the first initialization transistor M4 is connected to a first gate driving line.

The first initialization transistor M4 and the writing transistor M2 are turned on in the time-sharing manner in the continuous time period.

It should be noted that, the first initialization line is configured to transmit a first initialization signal VI1. The first gate driving line is configured to transmit the first gate driving signal NscanL.

It may be understood that, the compensation transistor M3 remains the turned-on state in only one continuous time period in each frame. In this way, the compensation transistor M3 and the first initialization transistor M4 can be controlled to be synchronously turned on in the continuous time period to reset the first node C, the second node A, and the third node B once, so that a threshold voltage drift of the driving transistor M1 can be reduced or prevented, and light-emitting luminance of the pixel circuit P1 can be stabilized, thereby reducing a risk of flickers.

In some embodiments, the initialization module further includes a second initialization transistor M8, the second initialization transistor M8 is connected in series between a second initialization line and the second node A or the third node B, and a gate of the second initialization transistor M8 is connected to a second gate driving line. The first initialization transistor M4, the second initialization transistor M8, and the writing transistor M2 are turned on in the time-sharing manner in the continuous time period.

It may be understood that, the compensation transistor M3 remains the turned-on state in only one continuous time period in each frame, and the first initialization transistor M4, the second initialization transistor M8, and the writing transistor M2 are turned on in the time-sharing manner in the continuous time period. In this way, the compensation transistor M3 and the second initialization transistor M8 can be controlled to synchronously turn on in the continuous time period to reset the first node C, the second node A, and the third node B once; the compensation transistor M3 and the first initialization transistor M4 can also be controlled to synchronously turn on in the continuous time period to reset the first node C, the second node A, and the third node B once again; and the compensation transistor M3 and the writing transistor M2 can also be controlled to synchronously turn on in the continuous time period to write the data signal into the gate of the driving transistor M1, so that a threshold voltage drift of the driving transistor M1 can be reduced or prevented, and light-emitting luminance of the pixel circuit P1 can be stabilized, thereby reducing a risk of flickers.

The second initialization line is configured to transmit a second initialization signal VI3. The second gate driving line is configured to transmit the second gate driving signal EMR. The third gate driving line is configured to transmit a third gate driving signal NscanR.

The continuous time period may be a continuous time period of one pulse of the third gate driving signal NscanR.

Both of the first initialization transistor M4 and the compensation transistor M3 can be N-channel metal oxide thin film transistors to reduce electric leakage of the gate of the driving transistor M1, which reduces a luminance difference in maintaining the pixel circuit P1 at a low refresh frequency, thereby improving a flickering phenomenon.

The driving transistor M1, the second initialization transistor M8, the first light-emitting control transistor M5, and the second light-emitting control transistor M6 can be P-channel type low-temperature polysilicon thin film transistors, so as to improve dynamic performance of the pixel circuit P1.

In some embodiments, the pixel circuit P1 further includes at least one of a light-emitting device D1, a storage capacitor Cst, a boost capacitor Cboost, or a third initialization transistor M7. The storage capacitor Cst is connected in series between the first node C and the first power cable. The boost capacitor Cboost is connected in series between the first node C and the scanning line. The light-emitting device D1 is connected in series between the second light-emitting control transistor M6 and the second power cable. The third initialization transistor M7 is connected in series between a third initialization line and an anode of the light-emitting device D1, and a gate of the third initialization transistor M7 is connected to the gate of the second initialization transistor M8.

It should be noted that, the light-emitting device D1 may be an organic light-emitting diode, a micro-light-emitting diode, a mini-light-emitting diode, or a quantum dot light-emitting diode.

A channel type of the third initialization transistor M7 may be the same as a channel type of the second initialization transistor M8, for example, a P-channel low-temperature polysilicon thin film transistor. The gate of the third initialization transistor M7 and the gate of the second initialization transistor M8 share a same second gate driving line, which reduces a quantity of light-emitting control lines required by the pixel circuit P1, thereby reducing an occupied area of a display area and improving an aperture ratio and pixel density. In addition, the anode of the light-emitting device D1 can be reset synchronously following the second initialization transistor M8.

The third initialization line is configured to transmit a third initialization signal VI2.

A working process of the pixel circuit P1 shown in FIG. 4 in a writing frame in each frame includes the following stages shown in FIG. 5 or 6.

In a first stage S1: the light-emitting control signal EML is at a high potential, and both the first light-emitting control transistor M5 and the second light-emitting control transistor M6 are switched off; the third gate driving signal NscanR is switched to a high potential, and the compensation transistor M3 is switched on; and the second gate driving signal EMR is switched to a low potential, both the second initialization transistor M8 and the third initialization transistor M7 are switched on, a potential of the first node C, a potential of the second node A, and a potential of the third node B are reset through the second initialization signal VI3, and the anode of the light-emitting device D1 is reset through the third initialization transistor M7.

In a second stage S2: the light-emitting control signal EML is at the high potential, and both the first light-emitting control transistor M5 and the second light-emitting control transistor M6 are switched off; the third gate driving signal NscanR still remains the high potential, and the compensation transistor M3 is switched on; and the first gate driving signal EML is switched to a high potential, the first initialization transistor M4 is switched on, and the potential of the first node C, the potential of the second node A, and the potential of the third node B are reset through the first initialization signal VI1.

In a third stage S3: the light-emitting control signal EML is at the high potential, and both the first light-emitting control transistor M5 and the second light-emitting control transistor M6 are switched off; the third gate driving signal NscanR still remains the high potential, and the compensation transistor M3 is switched on; and the scanning signal Pscan is switched to a low potential, the writing transistor M2 is switched on, and the data signal data successively passes through the writing transistor M2, the driving transistor M1, and the compensation transistor M3 to be written into the gate of the driving transistor M1.

In a fourth stage S4: the light-emitting control signal EML is at the high potential, and both the first light-emitting control transistor M5 and the second light-emitting control transistor M6 are switched off; the third gate driving signal NscanR is switched to a low potential, and the compensation transistor M3 is switched off; and the second gate driving signal EMR is switched to the low potential, both the second initialization transistor M8 and the third initialization transistor M7 are switched on, the second node A and the third node B are reset again through the second initialization transistor M8, and the anode of the light-emitting device D1 is reset again through the third initialization transistor M7.

In a fifth stage S5: the light-emitting control signal EML is at a low potential, and both the first light-emitting control transistor M5 and the second light-emitting control transistor M6 are switched on; and the light-emitting device D1 emits light.

It should be noted that, each frame includes a writing frame, and may further include a maintaining frame. Each writing frame or each maintaining frame includes the first stage S1, the second stage S2, the third stage S3, the fourth stage S4, and the fifth stage S5 sequentially in the time sequence. The continuous time period includes at least part of the first stage S1, the second stage S2, and at least part of the third stage S3*i*. In the first stage S1 of the writing frame, the compensation transistor M3 and the second initialization transistor M8 are in the turned-on state, to reset the potential of the first node C, the potential of the second node A, and the potential of the third node B through the second initialization line.

In other words, the compensation transistor M3 remains the turned-on state in the continuous time period of the writing frame, the first initialization transistor M4 is in the turned-on state in continuous duration of the writing frame, and the second initialization transistor M8 is in the turned-on state for a plurality of times in each writing frame or each maintaining frame.

In some embodiments, in the writing frame, a first conduction start time of the second initialization transistor M8 is earlier than a conduction start time of the first initialization transistor M4.

It should be noted that, as shown in FIG. 6, the present embodiment may be realized by making a falling edge of a first pulse of the second gate driving signal EMR earlier than a rising edge of a pulse of the first gate driving signal NscanL.

In some embodiments, in the writing frame, a conduction end time of the first initialization transistor M4 is earlier than a conduction end time of the compensation transistor M3, and the conduction end time of the compensation transistor M3 is earlier than second conduction start time of the second initialization transistor M8.

It should be noted that, as shown in FIG. 6, the present embodiment may be realized by making an end time of a pulse of the first gate driving signal NscanL earlier than an end time of a pulse of the third gate driving signal NscanR and making the end time of the pulse of the third gate driving signal NscanR earlier than a falling edge of a second pulse of the second gate driving signal EMR.

In some embodiments, as shown in FIG. 6, the first gate driving signal NscanL and the third gate driving signal NscanR each have one pulse in the writing frame, and the second gate driving signal EMR has a plurality of pulses in each writing frame or each maintaining frame.

It should be noted that, compared to the third gate driving signal NscanR shown in FIG. 5, in the third gate driving signal NscanR shown in FIG. 6, a quantity of pulses is reduced and a pulse width is increased, so that a known gate driving circuit is applicable, and a quantity of switching times of high and low potentials of the third gate driving signal NscanR can be reduced, thereby reducing power consumption and prolonging available duration of the compensation transistor M3.

In some embodiments, as shown in FIG. 6, in the writing frame, a first pulse end moment of the second gate driving signal EMR is earlier than a pulse end moment of the third gate driving signal NscanR, and a second pulse start moment of the second gate driving signal EMR is later than the pulse end moment of the third gate driving signal NscanR.

It should be noted that, in the present embodiment, the first node C, the second node A, and the third node B can be reset through a joint action of the compensation transistor M3 and the second initialization transistor M8; and the second node A and the third node B can also be reset through the second initialization transistor M8.

In some embodiments, in the writing frame, a pulse start moment of the first gate driving signal NscanL is equal to or later than a pulse start moment of the third gate driving signal NscanR, and a pulse end moment of the first gate driving signal NscanL is equal to or earlier than the pulse end moment of the third gate driving signal NscanR.

It should be noted that, in the present embodiment, through a joint action of the compensation transistor M3 and the first initialization transistor M4, the first node C can be reset; and the second node A and the third node B can also be reset.

Figure 7:
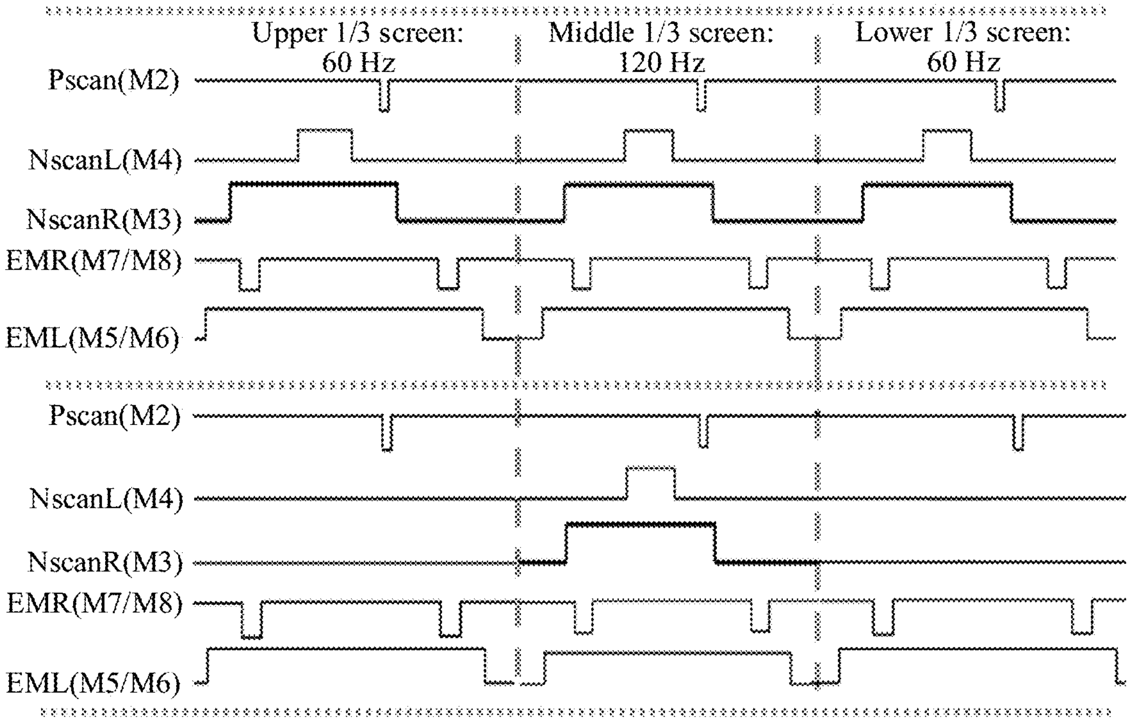
FIG. 7 is a schematic diagram of a time sequence of the pixel circuit shown in FIG. 4 implementing different refresh frequencies.

FIG. 7 is a schematic diagram of a time sequence of the pixel circuit P1 shown in FIG. 4 to implement different refresh frequencies. Two vertical dotted lines divide FIG. 7 into three screens, namely, an upper ⅓ screen, a middle ⅓ screen, and a lower ⅓ screen, for display. Three horizontal dotted lines divide a working time sequence into a first frame and a second frame. In other words, the two vertical dotted lines and the three horizontal dotted lines divide FIG. 7 into six time sequence partitions, upper and lower time sequence partitions on a left side are respectively a first frame and a second frame in the upper ⅓ screen, upper and lower time sequence partitions in the middle are respectively a first frame and a second frame in the middle ⅓ screen, and upper and lower time sequence partitions on a right side are respectively a first frame and a second frame in the lower ⅓ screen. Taking a condition, in which a maximum refresh frequency is 120 Hz, and the upper ⅓ screen, the middle ⅓ screen, and the lower ⅓ screen distributed along a scanning direction implement refresh frequencies of 60 Hz, 120 Hz and 60 Hz respectively, as an example, the explanation is as follows.

To enable the upper ⅓ screen to display with the 60 Hz refresh frequency, the first frame is displayed with the 120 Hz refresh frequency, and the first stage S1 to the fifth stage S5 in FIG. 6 are repeated. The second frame is displayed with the 120 Hz refresh frequency, and different from the first frame, the first gate driving signal NscanL and the third gate driving signal NscanR each have no corresponding positive pulse. The first gate driving signal NscanL may be a gate driving signal NscanR/L output by the gate driving circuit shown in FIG. 2A or 2B. The third gate driving signal NscanR may be another gate driving signal NscanR/L output by the gate driving circuit shown in FIG. 2A or 2B.

A combination of the first frame and the second frame may be displayed with the 60 Hz refresh frequency.

To enable the middle ⅓ screen to display with the 120 Hz refresh frequency, the first frame is displayed with the 120 Hz refresh frequency, and the first stage S1 to the fifth stage S5 in FIG. 6 are repeated. The second frame is the same as the first frame, and the first stage S1 to the fifth stage S5 in FIG. 6 are still repeated.

A time sequence of the lower ⅓ screen and a time sequence of the upper ⅓ screen are the same, so that the lower ⅓ screen can be displayed with the 60 Hz refresh frequency.

It should be noted that, another quantity of display partitions may be displayed with other refresh frequencies by analogy. For example, one display device may have one or more display partitions, and each display partition includes at least one row of pixel circuits P1. Each display partition may achieve a desired refresh frequency, for example, 30 Hz, 10 Hz, 5 Hz, or 1 Hz. Certainly, a maximum refresh frequency is also not limited to 120 Hz, and may alternatively be any refresh frequency of 240 Hz, 360 Hz, or higher.

In some embodiments, the present disclosure provides a display device, including the display panel provided in any one of the above embodiments.

It may be understood that, since the display device provided in the present embodiment includes the display panel provided in any one of the above embodiments, through only one pulse of a gate driving signal, the compensation transistor M3 remains the turned-on state in only one continuous time period in each frame can be implemented with only one pulse of a gate driving signal. Compared to a plurality of pulses of a gate driving signal, more driving methods for the pixel circuit P1 are obtained, and a quantity of high and low potential switching times of the gate driving signal and a quantity of switching times of the compensation transistor M3 are reduced, thereby reducing power consumption of the pixel circuit P1 and prolonging a service life of the compensation transistor M3.

In addition, the compensation transistor M3 remains the turned-on state in only one continuous time period in each frame, and the initialization module and the writing transistor M2 are turned on in the time-sharing manner in the continuous time period. In this way, the compensation transistor M3 and the initialization module can be controlled to be synchronously turned on in the continuous time period to reset the first node, the second node, and the third node once, and the compensation transistor M3 and the writing transistor M2 can also be controlled to be synchronously turned on in the continuous time period to write the data signal into the gate of the driving transistor M1, so that a threshold voltage drift of the driving transistor M1 can be reduced or prevented, and light-emitting luminance of the pixel circuit P1 can be stabilized, thereby reducing a risk of flickers.

In the foregoing embodiments, description of each embodiment focuses on a different part, and for parts that are not described in detail in one embodiment, reference may be made to the related description of other embodiments.

Some embodiments of the present disclosure have been described in detail above. The description of the above embodiments merely aims to help to understand the present disclosure. Many modifications or equivalent substitutions with respect to the embodiments may occur to those of ordinary skill in the art based on the present disclosure. Thus, these modifications or equivalent substitutions shall fall within the scope of the present disclosure.

What is claimed is:

1. A display panel, comprising: a pixel circuit, comprising: a driving transistor, wherein a gate of the driving transistor is configured to receive a scanning signal; a writing transistor, wherein a gate of the writing transistor is configured to receive the scanning signal, a first electrode of the writing transistor is configured to receive a data signal, and a second electrode of the writing transistor is connected to a first electrode of the driving transistor; an initialization module, wherein the initialization module is connected to at least one of the first electrode, a second electrode, and the gate of the driving transistor, to perform resetting based on at least one gate driving signal; and a compensation transistor, wherein a gate of the compensation transistor is configured to receive an additional gate driving signal, a first electrode of the compensation transistor is connected to the gate of the driving transistor, and a second electrode of the compensation transistor is connected to the first electrode of the driving transistor or the second electrode of the driving transistor, wherein the compensation transistor remains a turned-on state in only one continuous time period in each frame, and the initialization module and the writing transistor are turned on in a time-sharing manner in the continuous time period, and wherein: the initialization module comprises a first initialization transistor, a gate of the first initialization transistor is configured to receive a first gate driving signal of the at least one gate driving signal, a first electrode of the first initialization transistor is connected to the gate of the driving transistor, and a second electrode of the first initialization transistor is configured to receive a first initialization signal; and the first initialization transistor and the writing transistor are turned on in the time-sharing manner in the continuous time period.

2. The display panel as claimed in claim 1, wherein:

the initialization module further comprises a second initialization transistor, a gate of the second initialization transistor is configured to receive a second gate driving signal of the at least one gate driving signal, a first electrode of the second initialization transistor is configured to receive a second initialization signal, and a second electrode of the second initialization transistor is connected to the first electrode of the driving transistor, wherein the first initialization transistor, the second initialization transistor, and the writing transistor are turned on in the time-sharing manner in the continuous time period.

3. The display panel as claimed in claim 2, wherein:

the each frame comprises one or more writing frames and one or more maintaining frames, and each of the writing frames or each of the maintaining frames comprises a first stage, a second stage, a third stage, a fourth stage, and a fifth stage that are performed in time sequence;

the continuous time period comprises at least part of the first stage, the second stage, and at least part of the third stage; and in the first stage of the each of the writing frames, the compensation transistor and the second initialization transistor are in the turned-on state, to reset a potential of each of the first electrode, a second electrode, and the gate of the driving transistor through the second initialization signal.

4. The display panel as claimed in claim 3, wherein in the second stage of the each of the writing frames, the compensation transistor and the first initialization transistor are in the turned-on state, to reset the potential of each of the first electrode, the second electrode, and the gate of the driving transistor through the first initialization signal.

5. The display panel as claimed in claim 3, wherein in the third stage of the each of the writing frames, the compensation transistor and the writing transistor are in the turned-on state, to write the data signal into the gate of the driving transistor.

6. The display panel as claimed in claim 2, wherein:

the each frame comprises one or more writing frames and one or more maintaining frames, the compensation transistor remains the turned-on state in the continuous time period of each of the writing frames, the first initialization transistor is in the turned-on state in continuous duration of the each of the writing frames, and the second initialization transistor is in the turned-on state a plurality of times in the each of the writing frames or each of maintaining frames.

7. The display panel as claimed in claim 6, wherein in the each of the writing frames, a first conduction start time of the second initialization transistor is earlier than a conduction start time of the first initialization transistor.

8. The display panel as claimed in claim 6, wherein in the writing frame, a conduction end time of the first initialization transistor is earlier than a conduction end time of the compensation transistor, and the conduction end time of the compensation transistor is earlier than a second conduction start time of the second initialization transistor.

9. The display panel as claimed in claim 2, wherein the each frame comprises one or more writing frames and one or more maintaining frames, the first gate driving signal and the additional gate driving signal each have one pulse in each of the writing frame, and the second gate driving signal has a plurality of pulses in the each of the writing frames or each of the maintaining frames.

10. The display panel as claimed in claim 9, wherein in the writing frame, a first pulse end moment of the second gate driving signal is earlier than a pulse end moment of the additional gate driving signal, and a second pulse start moment of the second gate driving signal is later than the pulse end moment of the additional gate driving signal.

11. The display panel as claimed in claim 10, wherein in the writing frame, a pulse start moment of the first gate driving signal is equal to or later than a pulse start moment of the additional gate driving signal, and a pulse end moment of the first gate driving signal is equal to or earlier than the pulse end moment of the additional gate driving signal.

12. The display panel as claimed in claim 3, wherein the pixel circuit further comprises a first light-emitting control transistor and a second light-emitting control transistor, a first electrode of the first light-emitting control transistor is connected to the first electrode of the driving transistor, a second electrode of the first light-emitting control transistor is configured to receive a positive power signal, and a gate of the first light-emitting control transistor is configured to receive a light-emitting control signal, a first electrode of the second light-emitting control transistor is connected to the second electrode of the driving transistor, a second electrode of the first light-emitting control transistor is configured to receive a negative power signal, and a gate of the second light-emitting control transistor is configured to receive the light-emitting control signal; and the light-emitting control signal controls both the first light-emitting control transistor and the second light-emitting control transistor to be in a turned-off state outside the fifth stage of the each of the writing frames or the each of the maintaining frames, and controls both the first light-emitting control transistor and the second light-emitting control transistor to be in the turned-on state in the fifth stage of each writing frame or each maintaining frame.

13. A display device, comprising a display panel, wherein the display panel comprises:

a pixel circuit, comprising:

a driving transistor, wherein a gate of the driving transistor is configured to receive a scanning signal;

a writing transistor, wherein a gate of the writing transistor is configured to receive the scanning signal, a first electrode of the writing transistor configured to receive a data signal, and a second electrode of the writing transistor is connected to a first electrode of the driving transistor;

an initialization module, wherein the initialization module is connected to at least one of the first electrode, a second electrode, and the gate of the driving transistor, to perform resetting based on at least one gate driving signal; and a compensation transistor, wherein a gate of the compensation transistor is configured to receive an additional gate driving signal, a first electrode of the compensation transistor is connected to the gate of the driving transistor, and a second electrode of the compensation transistor is connected to the first electrode of the driving transistor or the second electrode of the driving transistor, wherein the compensation transistor remains a turned-on state in only one continuous time period in each frame, and the initialization module and the writing transistor are turned on in a time-sharing manner in the continuous time period;

wherein the pixel circuit further comprises a light-emitting device, a storage capacitor, a boost capacitor, and a third initialization transistor, a first terminal of the storage capacitor is connected to the gate of the driving transistor, and a second terminal of the storage capacitor is configured to receive a positive power signal, a first terminal of the boost capacitor is connected to the gate of the driving transistor, and a second terminal of the boost capacitor is configured to receive the scanning signal, a first terminal of the light-emitting device is connected to the second electrode of the driving transistor, and a second terminal of the light-emitting device is configured to receive a negative power signal, and a gate of the third initialization transistor is connected to the gate of the second initialization transistor, a first electrode of the third initialization transistor is connected to an anode of the light-emitting device, and a second electrode of the third initialization transistor is configured to receive an initialization signal.

14. The display device as claimed in claim 13, wherein:

the initialization module comprises a first initialization transistor, a gate of the first initialization transistor is configured to receive a first gate driving signal of the at least one gate driving signal, a first electrode of the first initialization transistor is connected to the gate of the driving transistor, and a second electrode of the first initialization transistor is configured to receive a first initialization signal; and the first initialization transistor and the writing transistor are turned on in the time-sharing manner in the continuous time period.

15. The display device as claimed in claim 14, wherein:

the initialization module further comprises a second initialization transistor, a gate of the second initialization transistor is configured to receive a second gate driving signal of the at least one gate driving signal, a first electrode of the second initialization transistor is configured to receive a second initialization signal, and a second electrode of the second initialization transistor is connected to the first electrode of the driving transistor, wherein the first initialization transistor, the second initialization transistor, and the writing transistor are turned on in the time-sharing manner in the continuous time period.

16. The display device as claimed in claim 15, wherein:

the each frame comprises one or more writing frames and one or more maintaining frames, and each of the writing frames or each of the maintaining frames comprises a first stage, a second stage, a third stage, a fourth stage, and a fifth stage that are performed in time sequence;

the continuous time period comprises at least part of the first stage, the second stage, and at least part of the third stage; and in the first stage of the each of the writing frames, the compensation transistor and the second initialization transistor are in the turned-on state, to reset a potential of each of the first electrode, a second electrode, and the gate of the driving transistor e through the second initialization signal.

17. The display device as claimed in claim 16, wherein in the second stage of the each of the writing frames, the compensation transistor and the first initialization transistor are in the turned-on state, to reset the potential of each of the first electrode, a second electrode, and the gate of the driving transistor through the first initialization line.

18. The display device as claimed in claim 16, wherein in the third stage of the each of the writing frames, the compensation transistor and the writing transistor are in the turned-on state, to write the data signal into the gate of the driving transistor.

19. The display device as claimed in claim 15, wherein:

the each frame comprises one or more writing frames and one or more maintaining frames, the compensation transistor remains the turned-on state in the continuous time period of each of the writing frames, the first initialization transistor is in the turned-on state in continuous duration of the each of the writing frames, and the second initialization transistor is in the turned-on state a plurality of times in the each of the writing frames or each of maintaining frames.

* * * * *